United States Patent [19]

Lörcks et al.

[11] Patent Number: 5,244,474
[45] Date of Patent: Sep. 14, 1993

[54] STARCH COMPOSITION

[75] Inventors: Jürgen H. T. Lörcks, Rees-Androp; Horst Neisius, Kleve, both of Fed. Rep. of Germany

[73] Assignee: Cerestar Holding B.V., Belgium

[21] Appl. No.: 849,577

[22] Filed: Mar. 11, 1992

[30] Foreign Application Priority Data

Mar. 12, 1991 [GB] United Kingdom ............... 9105208

[51] Int. Cl.$^5$ ............................................. C10L 5/12
[52] U.S. Cl. ...................................... 44/557; 44/577; 106/210
[58] Field of Search ................ 44/557, 577; 106/210

[56] References Cited

U.S. PATENT DOCUMENTS

| | | | |
|---|---|---|---|
| 1,290,992 | 1/1919 | Hite | 44/577 |
| 2,349,342 | 5/1944 | Erickson | 44/577 |
| 4,501,593 | 2/1985 | Paersch et al. | 44/557 |
| 4,738,685 | 4/1988 | Goleczka et al. | 44/557 |
| 4,853,168 | 8/1989 | Eden et al. | |

FOREIGN PATENT DOCUMENTS 0229905  3/1925  United Kingdom ............... 44/577

Primary Examiner—Jacqueline V. Howard
Attorney, Agent, or Firm—Cushman, Darby & Cushman

[57] ABSTRACT

A starch product which comprises gelatinized starch sulphamate and gelatinized starch phosphate is useful as a binder, particularly for coal briquettes. The product may be made by mixing preformed starch sulphamate and preformed starch phosphate but may also be prepared by heating gelatinized starch, gelatinized starch and a gelatinous starch sulphamate or gelatinized starch, and a gelatinized starch phosphate with, respectively a sulphamate and a phosphate, a phosphate or a sulphamate. Briquettes made from coal and the starch product having good bonding strength and carbonize with a clear flame.

16 Claims, No Drawings

STARCH COMPOSITION

The present invention relates to a starch product in particular to a starch product derived from starch and a sulphamate and a phosphate.

European patent 129 227 describes the preparation and suggested uses of starch sulphamates. These products are made by heating gelatinized starch with 3 to 40 w/w % of a sulphamate salt selected from ammonium sulphamate, alkali metal sulphamates and alkaline search metal sulphamates at a temperature in the range of 40°–250° C. in the presence of at least about 30 w/w % water. The starch, which may be physically or chemically modified, is either pre-gelatinised or is gelantinised in situ. The starch sulphamates made in accordance with EP 129 227 are said to have a high flame resistance, a high viscosity stability, a high water resistance and a high bonding strength on substrates such as paper, plasterboard, glass and mineral fibres, metal and plastic materials, rigid foams, mineral boards and stone and also to have thermoplastic properties giving flexible, water repellant, clearly transparent and heat-sealable, flame resistant films. These properties of the sulphamate starches make the products suitable for use in adhesives and as binders for paper, board, building materials, insulating materials, plastic materials, textiles and glass and mineral fibres. Uses of sulphamate starches which have been the subject of patent applications subsequent to EP 129 227, are, in combination with polyninylalcohol as a binder for fuel briquettes (EP 252 332 A) and, in combination with a hydrophobic agent such as a silicone, as a binder for glass fibres (EP 375 235 A). A particular advantage possessed by starch sulphamates in these latter applications is that as well as being flame resistant, the starch sulphamates carbonise without giving off sooty fumes.

Although starch sulphamates are flame resistant, starches are in general highly inflammable. Some improvement in flame resistance may be achieved, as is mentioned in EP 129 227 by blending or reacting the starch with phosphates although such a procedure tends to affect adversely other properties of the starch.

We have now found that a product comprising a starch sulphamate and a starch phosphate shows a synergistic effect in respect of certain important properties, particularly bonding strength and gas emission on carbonisation. Such a mixture is therefore of especial use as a binder for fuel briquettes, carbon powder, metal and other powder composites, ceramic compositions, glass wool and sawdust and particleboards.

Accordingly, the invention is a starch product which comprises gelatinised starch sulphamate and gelatinised starch phosphate.

The starch product may be produced by mixing a performed gelatinised starch sulphamate with a preformed gelatinised starch phosphate. Alternatively, the starch product may be produced by contacting at a temperature of from 40° to 250° C. in the presence of at least 30% by weight water based upon the total weight of the mixture, (a) a gelatinised starch with one or more sulphamates and one or more phosphates or, (b) a preformed gelatinised starch sulphamate and, optionally, gelatinised starch, with one or more phosphates or, (c) a preformed gelatinised starch phosphate and, optionally, gelatinised starch, with one or more sulphamates, the amount of sulphamate plus phosphate groups being 3 to 40% by weight of the starch solids. Method (a) is generally most suitable for the preparation of the products according to the invention.

The total content of solids i.e. starch, phosphate and sulphamate in the mixture used to obtain the products of the invention preferably lies in the range 20% and 80% more preferably 35% to 60%, especially 40% to 55% by weight.

The sulphamate and phosphate cations are preferably selected from the group consisting of alkali metal, alkaline-earth metal, magnesium, iron, aluminium and ammonium cations and may be the same or different for the two salts. Most preferred are sodium, ammonium, magnesium and calcium sulphamates and phosphates.

The mole ratio of sulphamate to phosphate groups in the product of the invention is preferably 2.0 to 0.1:1 more preferably 0.8 to 0.2:1. The total quantity of sulphamate plus phosphate which is present in the product according to the invention is preferably 5% to 35%, more preferably 7.5% to 30% and especially 10% to 25% by weight, based on the starch solids.

The starch which is used in preparing the products of the invention may be pregelatinised or may be gelatinised in situ. The starch may be any commercially available starch i.e. a grain or tuber starch, particularly maize starch, waxy maize starch, wheat starch or potato starch. If a modified starch is used the modification may be by cationisation, esterification e.g. starch acetate, etherification e.g. propoxylated starch or oxidation. The modification of the starch may also have been achieved by degradation as in a dextrin, maltodextrin, glucose syrup or glucose. It is an advantage of the present invention that lower grade starches may be used to make the product e.g. the so-called wheat 'B' starch.

The choice of a temperature within the range 40° to 250° C. may be made according to the principle described in EP 129 227 i.e. higher temperatures accelerate the production but increase the danger of degradation while the temperature should be high enough to ensure that the starch is gelatinised, if the gelatinisation takes place in situ. The preferred temperature range is 80° to 200° C. particularly 120° to 180° C. As in the process described in EP 129 227 the product according to the invention may be produced in solid form by roll-drying in which the starch is contacted with the sulphamate and phosphate on the rollers or, alternatively, the product may be produced in a starch cooker, which is the preferred method of production when the product is to be used in slurry form. A further method of producing the products according to the invention is by use of an extruder to achieve the desired temperature.

The products according to the invention may be used in any of the applications described for the analogous sulphamate product in EP 129 227. Thus, the products may be combined with a vinyl polymer in the manner described in EP 129 227 but the particularly advantageous used of the products is as binding agents especially for fuel briquettes, ceramics, metal powders, particle board and glass fibre mats.

An excellent binder for a coal briquette is made from 86% by weight maize starch or wheat starch, particularly wheat "B" starch, 4% by weight sulphamic acid, 10% by weight phosphoric acid neutralised with ammonia and heated to 40° to 250° C. as described in Example 1 which follows. 3% by weight dry substance of this binder mixed with 97% by weight coal dust and heated in a briquetting press gave a good quality briquette. When a similar briquette was made from a physical mixture of 97% by weight coal dust, 0.12% by weight ammonium sulphamate, 0.3% by weight ammonium phosphate and 2.68% by weight maize starch an inferior briquette was obtained because the binder lacked temperature resistance in the briquetting process.

The invention will now be further described with reference to the following Examples.

EXAMPLE 1

Slurries were prepared of maize starch in water to which were added sulphamic acid (3% by weight starch) and phosphoric acid (3% to 10% by weight starch) and the slurries neutralised with ammonia. The slurries were then heated at 140° C. for 3 minutes in a starch cooker, the solids contents of the compositions lying in the range 25-38% by weight.

The products from the cooker were in paste form and were either mixed with coal dust along (2.6-4.5% by weight starch product) or with coal dust and molasses (10% by weight molasses, 0.6 to 1.5% by weight starch product). The mixtures so prepared were pressed in a briquetting press, heated to 200° to 270° C. and then cooled on an open belt conveyer. Compared with briquettes made from sulphamate starch without phosphate the briquettes had increased bonding strength, contained less sulphur and nitrogen, yet burned with a clear flame.

EXAMPLE 2

A slurry of maize starch in water was mixed with 3.8% by weight sulphamic acid and 8.6% by weight phosphoric acid based on starch. The slurry was next neutralised with ammonia solution followed by the addition of sodium carbonate (0.08% by weight starch). The slurry was roll dried in standard equipment at a temperature of 140° C. and the roll dried product ground to a powder.

The powdered product was mixed with powdered carbon and the powder mixture was granulated in the presence of water at a temperature of 200° to 270° C.

EXAMPLE 3

A slurry of maize starch, glucose (9.2% by weight starch) sulphamic acid (1.2% by weight starch) and phosphoric acid (3.8% by weight starch) was prepared and neutralised with ammonia solution. The slurry was then heated in a continuous starch cooker at 130° C. for 2 minutes.

The slurry product was mixed with a powdered ceramic mixture and compressed in the presence of 1-3% by weight water at a temperature of 20°-40° C. to give a ceramic article.

EXAMPLE 4

A roll-dried product was produced as in Example 2 and was used to produce particleboard by mixing (5 to 12% by weight) with water 3 to 20% by weight) and sawdust or wood fibre before shaped in a press at 140° C. to 200° C.

We claim:

1. In an article of manufacture comprising particles and a binder, said article being selected from the group consisting of fuel briquettes, carbon powder composites, glass wool, saw-dust and particle board; the improvement in which said binder is a starch product which comprises gelatinized starch sulphamate and gelatinized starch phosphate.

2. An article as set forth in claim 1 in which the starch product is produced by mixing a preformed gelatinized starch sulphamate with a preformed gelatinized starch phosphate.

3. An article as set forth in claim 2 in which the starch product is produced by contacting at a temperature of from 40° to 250° C. in the presence of at least 30% by weight water based upon the total weight of the mixture,
   (a) a gelatinized starch with one or more sulphamates and one or more phosphates or,
   (b) a preformed gelatinized starch sulphamate and, optionally, gelatinized starch with one or more phosphates or,
   (c) a preformed gelatinized starch phosphate and, optionally, gelatinized starch, with one or more sulphamates,
the amount of sulphamate plus phosphate groups being 3 to 40% by weight of the starch solids.

4. An article according to claim 3 in which the sulphamate and phosphate cations, which may be the same or different for the two salts, are selected from the group consisting of alkali metal, alkaline earth metal, magnesium, iron, aluminum an ammonium cations.

5. An article as set forth in claim 3 or claim 4 in which, in the starch product, the total solids content of the mixture lies in the range 20% to 80%.

6. An article as set forth in claim 5 in which, in the starch product, the total solids content of the mixture lies in the range 35% to 60%.

7. An article as set forth in claim 5 in which, in the starch product, the total solids content of the mixture lies in the range 40% to 55%.

8. An article as set forth in claim 3 or 4 in which the temperature is in the range 80° to 200° C.

9. An article as set forth in claim 3 or claim 4 in which the temperature is in the range 120° to 180° C.

10. An article as set forth in claim 1 in which the mole ratio of sulphamate to phosphate groups is in the range 2.0 to 0.1:1.

11. An article as set forth in claim 1 in which the mole ratio of sulphamate to phosphate groups is in the range 0.8 to 0.2:1.

12. An article as set forth in claim 1 in which the total quantity of sulphamate plus phosphate groups is 5 to 35% by weight based on starch solids.

13. An article as set forth in claim 1 in which the total quantity of sulphamate plus phosphate groups is 7.5 to 30% by weight based on starch solids.

14. An article as set forth in claim 1 in which the total quantity of sulphamate plus phosphate groups is 10 to 25% by weight based on starch solids.

15. An article as set forth in claim 1 in which the starch is selected from the group consisting of maize starch, waxy maize starch, wheat starch, and potato starch.

16. An article as set forth in claim 15 in which the starch is wheat "B" starch.

* * * * *